Patented Nov. 16, 1926.

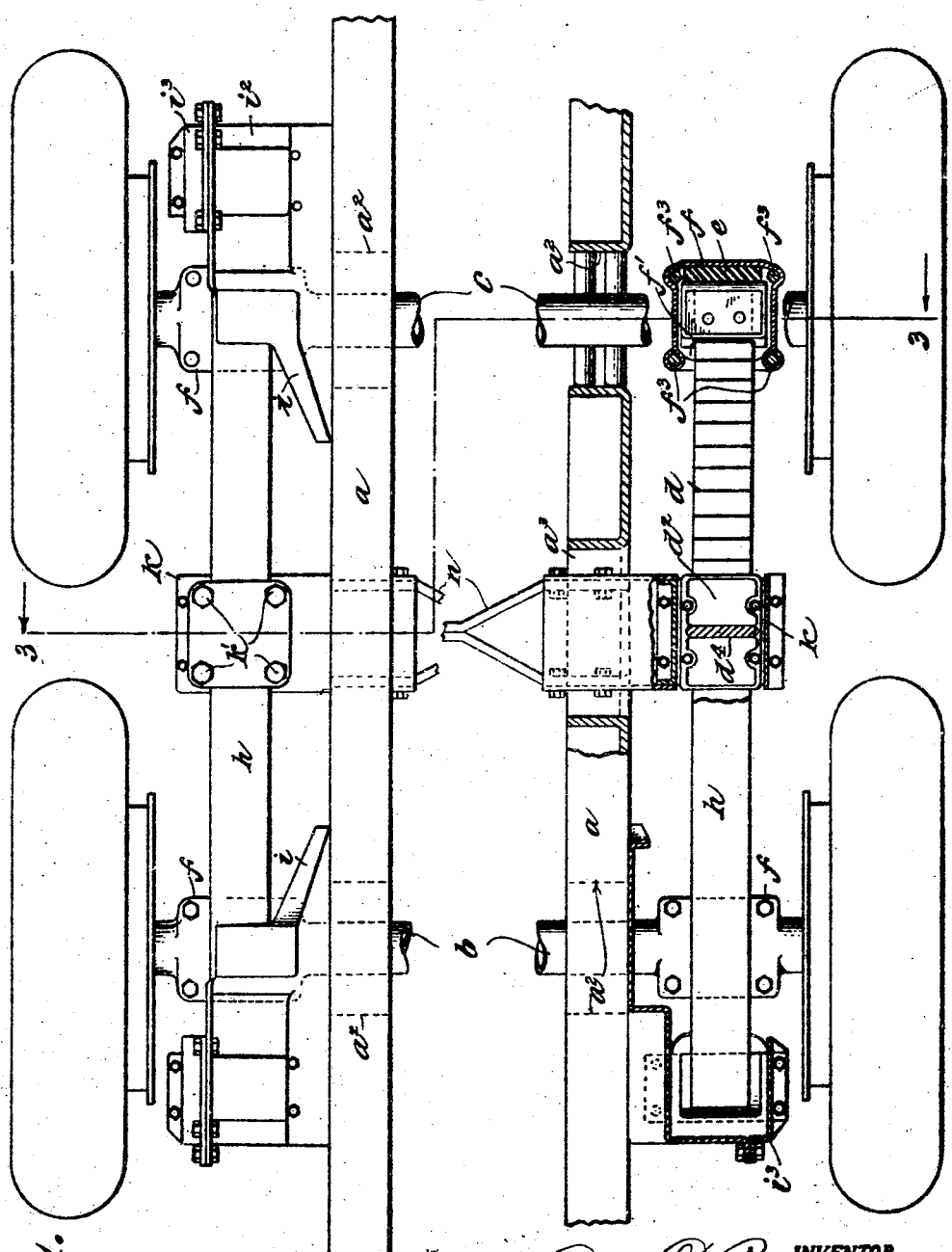

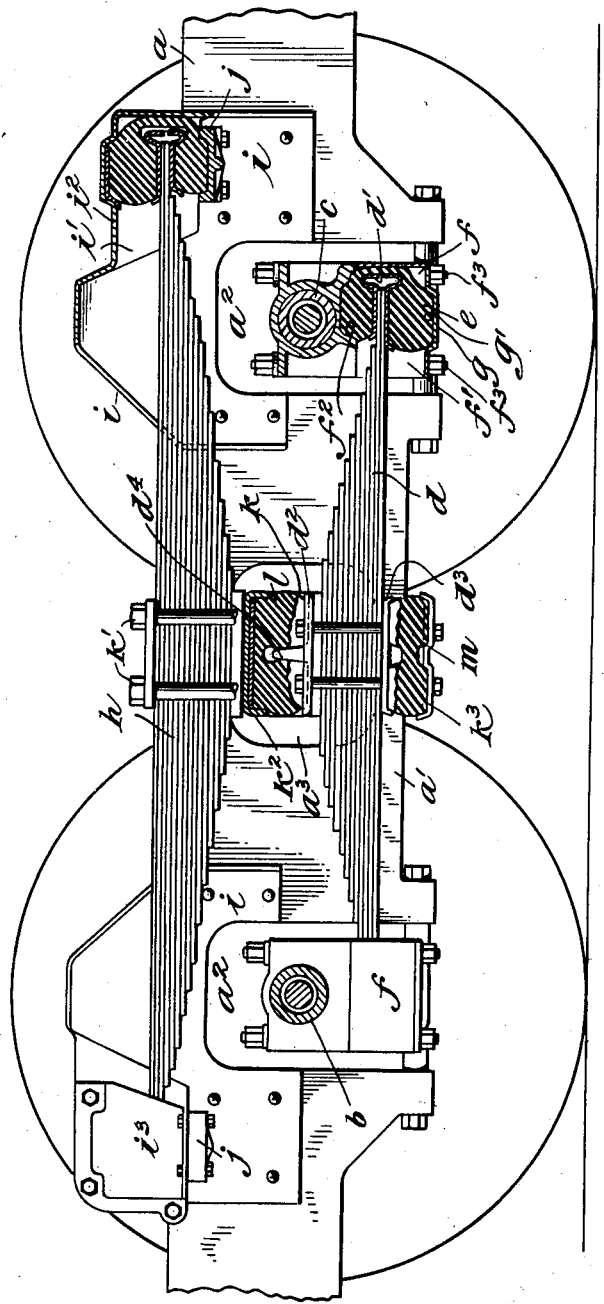

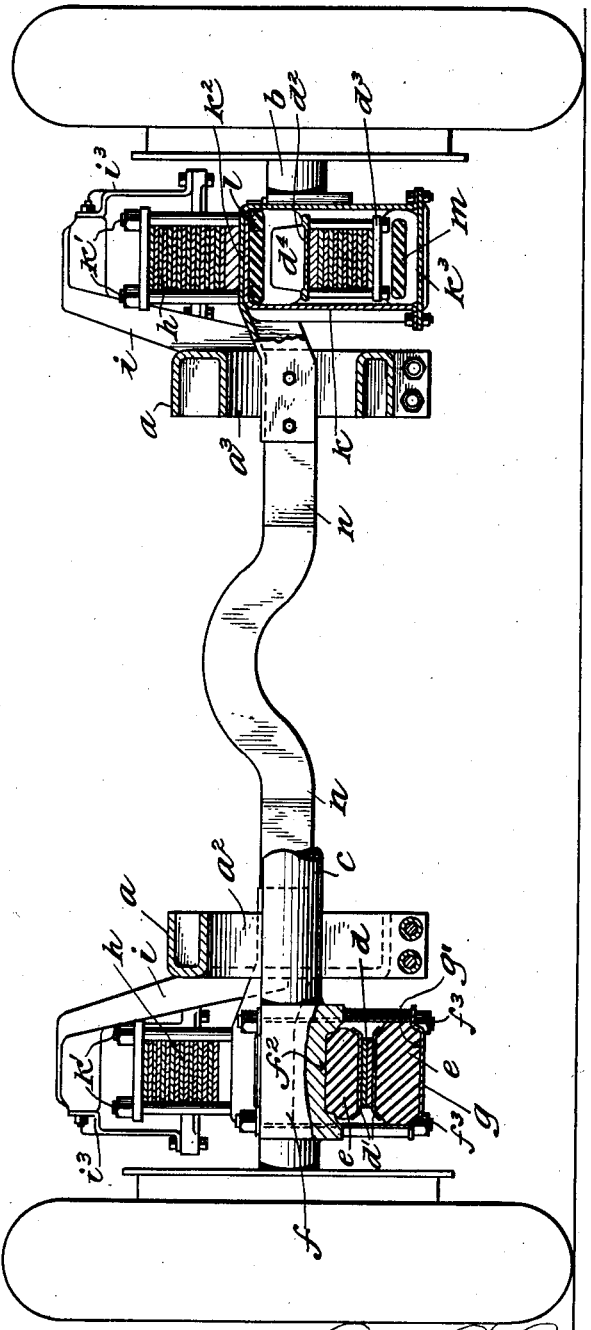

1,607,307

UNITED STATES PATENT OFFICE.

AZOR D. ROBBINS, OF NEW YORK, N. Y., ASSIGNOR TO INTERNATIONAL MOTOR COMPANY, OF NEW YORK, N. Y., A CORPORATION OF DELAWARE.

SPRING SUSPENSION.

Application filed August 14, 1924. Serial No. 731,950.

This invention relates to spring suspension for vehicles and more particularly to a spring suspension of motor propelled vehicles having dual rear driving axles. Where dual axles are employed, when direction is changed, the wheels have a tendency to continue in their previous direction of travel thereby setting up stresses in the structure which are deleterious. Furthermore the provision of a sufficiently yielding spring suspension with a construction of the type described presents a greater problem than is encountered in the provision of a flexible spring suspension for use in connection with a single axle. In the co-pending application of August H. Leipert Ser. No. 667,610 filed October 10, 1923, a spring suspension adapted for dual rear drive is disclosed. The present invention contemplates an improvement in the spring suspension shown and described in the aforesaid application by a rearrangement of the co-operating elements and a simplification of the same and a strengthening of the structure to better counteract the shocks and stresses impressed upon such a spring suspension in actual practice over rough and uneven roadways under heavy load. Accordingly a spring suspension is provided which includes a plurality of springs connected with each other and with the chassis and axle respectively and having yielding non-metallic connections interposed operatively between the respective springs and axles and chassis whereby a degree of universal movement of the axle with respect to the chassis is afforded in order to provide a greater degree of rigidity without detracting in any manner from the compensation afforded by the spring suspension. It is also proposed to provide a transverse strengthening element or suitable truss extending between the spring structures on the respective sides of the vehicle in substantially the plane of pivotal movement thereof. In order that the invention may be clearly understood the same will now be described more fully in connection with the accompanying drawings illustrating a preferred embodiment thereof and in which:

Figure 1 is a fragmentary view in plan of the improved construction showing the relation of the springs at opposite sides of the side frame members of the chassis.

Figure 2 is a view inside elevation showing somewhat conventionally so much of the side frame member of a motor vehicle as is necessary for an understanding of the suspension thereof from dual axles in accordance with the improvements, parts being broken away in the interest of clearness.

Figure 3 is a view, partly in section and partly in elevation taken in the planes indicated by the broken line 3—3 in Figure 1 and looking in the direction of the arrows.

The chassis side frame members $a$ are to be supported, in the illustrated embodiment, on the dual axles $b$, $c$, respectively which are illustrated as dead axles within which live axles rotate in well known manner. The side frame members $a$ are formed, as is sometimes the case, with a portion $a'$ of extended height provided with cut-out portions $a^2$ within which the axles are disposed with sufficient clearance for vertical and longitudinal movements. The chassis frame is of course suspended from the axles through a suitable suspension which in the illustrated embodiment comprises a lower spring $d$ extending in a longitudinal direction between the axles $b$ and $c$ and secured thereto through non-metallic connections of the type disclosed and claimed broadly in Letters Patent of the United States, Ser. No. 1,404,876 dated January 31, 1922. Such connections are illustrated as blocks of yielding non-metallic material $e$ which engage the respective ends of the spring and are in turn retained within housings $f$ respectively carried below the respective axles. A suitable casting formed integral with or secured in any convenient manner to the axle constitutes the housing $f$ and is formed with an open side $f'$ through which the spring extends, a closure $g$ being provided as the lowermost part of the housing removably secured thereto in any convenient manner as by means of the bolts $f^2$ to permit the insertion of the blocks $e$ which may be retained within the housing under compression by taking up on the bolts $f^2$. If desired, the housing and closure may be provided with opposed seats $f^3$, $g'$, respectively between which the rubber block is retained and if desired, co-operating seats $d'$ may also be provided on the ends of the spring. In this manner the block may be easily retained under internal static pressure whereby the strength, resiliency and wearing qualities of the block are improved. Midway between its ends the spring $d$ is adapted to be secured to the mid portion of the spring $h$ which is in turn connected at its ends to the side frame member $a$. In the illustrated embodiment a bracket $i$ is adapted to be secured to the side frame member adjacent the ends of the spring and this bracket is formed with an open side $i'$ into which the end of the spring extends. To the overturned portion $i^2$ of the bracket is adapted to be secured a casting $i^3$ constituting the outer face of a housing for a rubber block connection similar to that described in connection with the spring $d$, a closure for the housing being indicated at $j$.

The lower spring $d$ is adapted to be secured at its mid-point to the mid-point of the upper spring $h$ through a connection involving the use of yielding non-metallic material. To this end a housing $k$ is carried as by suitable bolts $k'$ with the upper spring and this housing is formed with complementary seats $k^2, k^3$, respectively between which, and co-operating seats $d^2$ carried with spring $d$ are adapted to be interposed blocks of yielding non-metallic material, the block $l$ being disposed between the upper seat $d^2$ and the seat $k^2$ and the block $m$ being disposed between the lower seat $d^3$ and the seat $k^3$. It will be observed that seat $d^2$ is formed with a projecting portion $d^4$ which is adapted to be engaged by portions of the block $l$ to further the rigid connection of the seat $d^3$ with the block. Blocks $l$ and $m$ are placed under the desired internal static pressure by means of appropriate bolts serving to draw the cooperating seats together. Extending between the housing $k$ on the respective sides of the vehicle and secured thereto in any convenient manner is a stabilizing strut $n$ which passes through apertures $a^3$ in the respective side frame members $a$. Since the springs are interconnected at their mid-points it will be apparent that the stabilizing strut $n$ is disposed in substantially the plane of pivotal movement of the springs. In this manner the strut does not interfere with the provision for universal movement of the axle with respect to the frame and yet affords the desired degree of strength and rigidity.

The action of the improved suspension will be clear from the foregoing description. The yielding connections at the five points indicated at each side of the vehicle provide a degree of flexibility which permits universal movement with respect to the connected element. This action is particularly desirable in minimizing stresses when the vehicle, as a dual axle vehicle, changes direction in which event the wheels tend to continue their line of travel when the chassis is constrained to change its direction through the steering means. The cushion connections provided not only yieldingly constrain the wheels to change their direction but in so doing store up energy therebetween which is released after the turning movement has ceased as a means for quickly aligning the wheel with the new direction of travel. While providing for the maximum spring capacity by the particular relationship of the springs described on each side of the frame undesirable movements of the structure as a whole in a transverse direction with respect to the chassis frame is minimized by the use of the strut.

Changes in matters of design may be made without departing from the spirit of the invention.

What I claim is:

1. In a motor vehicle, in combination with a plurality of axles and a chassis, a spring suspension therefor including, upon either side of the vehicle, a plurality of springs connected with each other and with the chassis and axles respectively, yielding non-metallic connections for said springs interposed operatively at points between the respective springs and axles and chassis whereby a degree of universal movement of the axles with respect to the chassis is afforded, and stabilizing means between the connections between the springs on the respective sides of the vehicle.

2. In a motor vehicle, in combination with a plurality of axles and a chassis, a spring suspension therefor including a spring connected at its ends to the axles, a spring connected at its ends to the chassis, connections between the springs at their mid-points and stabilizing means extending between said last named connections on the respective sides of the vehicle.

3. In a motor vehicle, in combination with a plurality of axles and a chassis, a spring suspension therefor at either side of the vehicle and including a spring, yielding non-metallic connections between the ends of said spring and the axles, a second spring, yielding non-metallic connections between the ends thereof and the chassis, a yielding non-metallic connection between said springs at their mid-points, and a stabilizing strut extending between the last named connections on either side of the vehicle.

4. In a motor vehicle, in combination with a plurality of axles and a chassis, a spring suspension therefor including housings carried with the respective axles and having an open side into which the ends of one spring extend respectively, blocks of yielding non-metallic material disposed within the housings and engaging the ends of the respective springs, housings carried with the chassis frame and having open sides respectively into which the ends of another spring extend, blocks of yielding non-metallic material disposed between the housings respectively and engaging the ends of said last named springs, a housing carried at the midpoint of the last named spring and formed with an opening through which the first named spring extends and yielding non-metallic material disposed within the housing and engaging the second named spring.

This specification signed this 12th day of August A. D. 1924.

AZOR D. ROBBINS.